Aug. 11, 1964  E. B. ROCKWELL  3,143,955
BEVERAGE BREWING MACHINE
Filed Dec. 3, 1962  4 Sheets-Sheet 1

INVENTOR.
ERNEST B. ROCKWELL
BY HIS ATTORNEYS
HARRIS, KIECH, RUSSELL & KERN

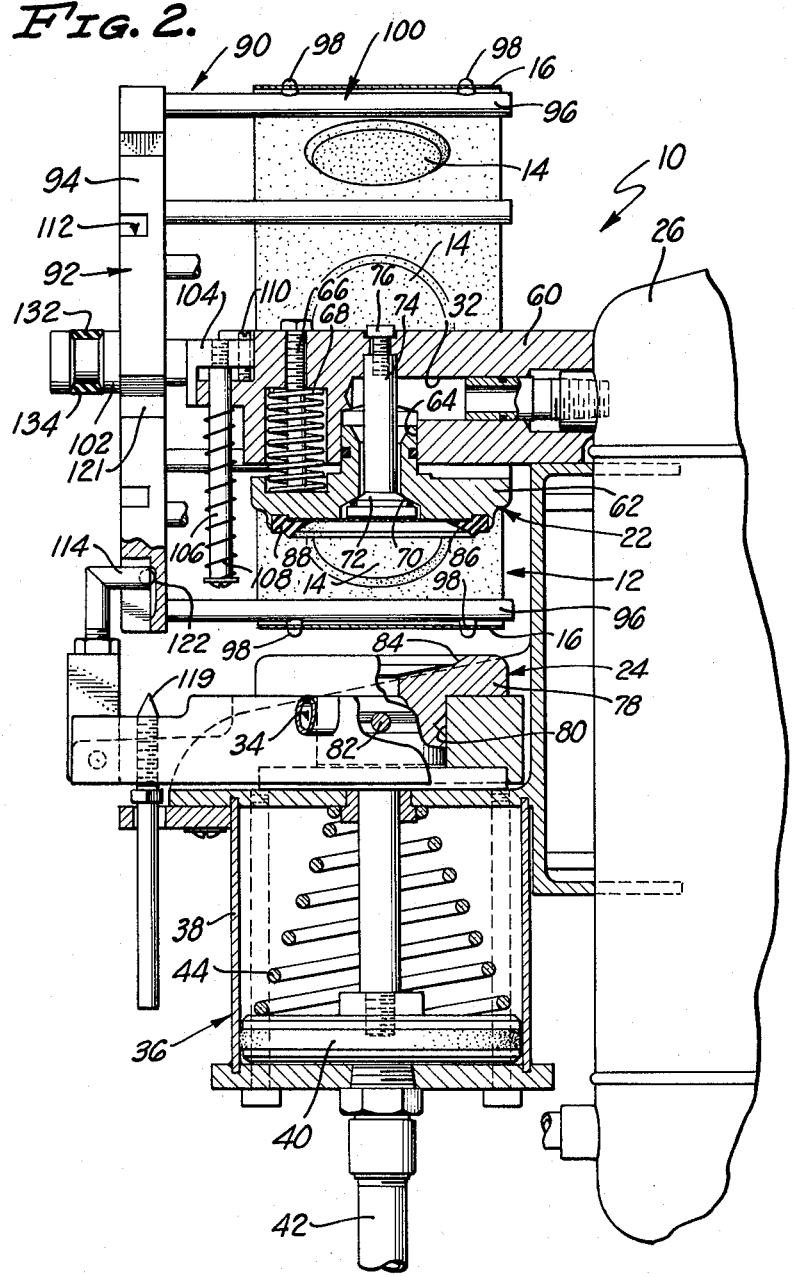

Aug. 11, 1964   E. B. ROCKWELL   3,143,955
BEVERAGE BREWING MACHINE
Filed Dec. 3, 1962   4 Sheets-Sheet 3
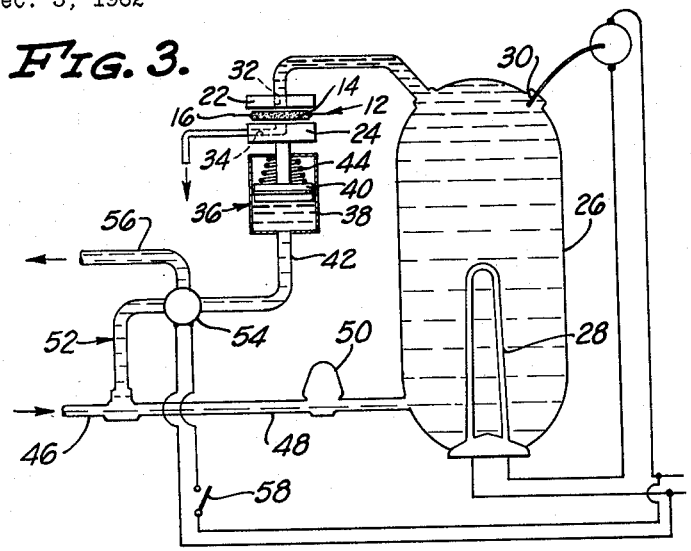
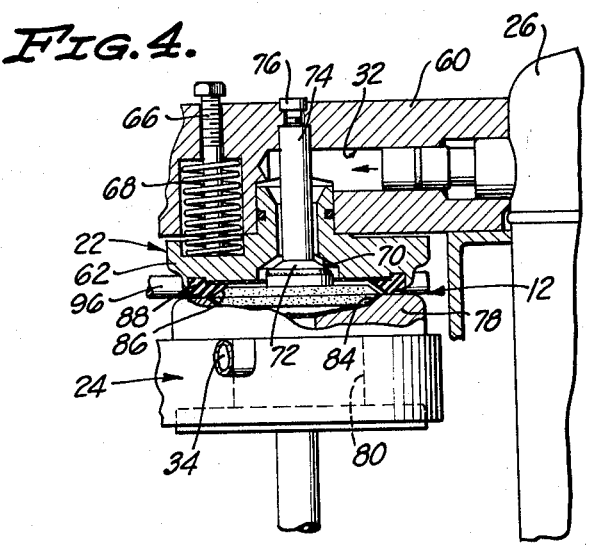
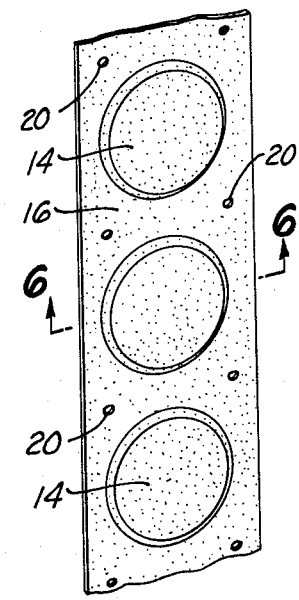
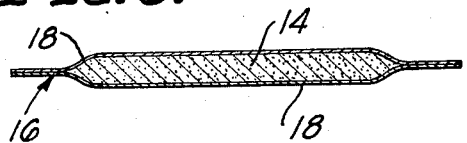
INVENTOR.
ERNEST B. ROCKWELL
BY HIS ATTORNEYS
HARRIS, KIECH, RUSSELL & KERN

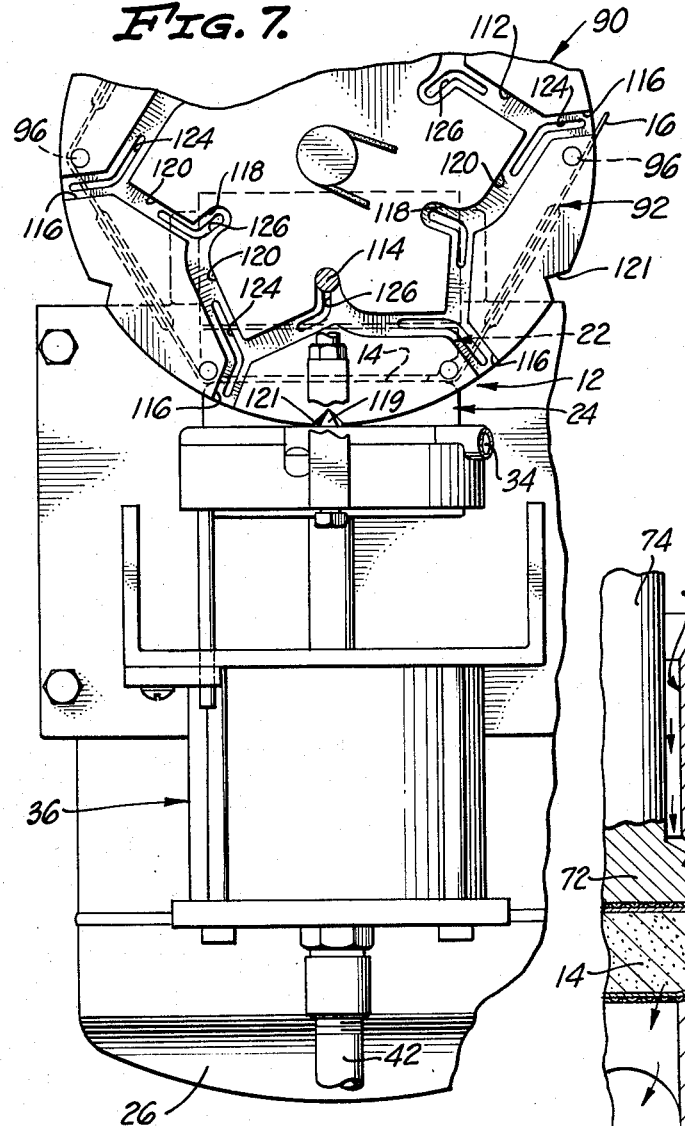
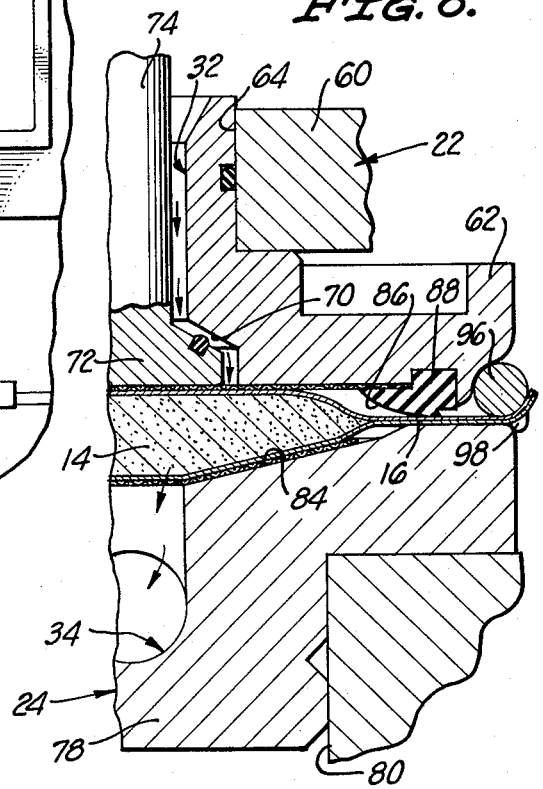

United States Patent Office 3,143,955
Patented Aug. 11, 1964

3,143,955
BEVERAGE BREWING MACHINE
Ernest B. Rockwell, Rolling Hills, Calif. (77—085 Michigan Drive, Palm Desert Country Club Estates, Palm Desert, Calif.)
Filed Dec. 3, 1962, Ser. No. 241,664
8 Claims. (Cl. 99—289)

The present invention relates in general to a beverage brewing apparatus and, more particularly, to a machine for brewing beverage servings, preferably individual servings, by flowing water through successive water-pervious compartments which are longitudinally spaced apart along a ribbon or tape and which contain the material from which the beverage is to be extracted.

For example, the invention may be utilized to produce individual servings of freshly brewed coffee, in which case hot water is caused to pass through individual batches of ground coffee in successive compartments in the ribbon. While the invention may be utilized for brewing other beverages as well, it will be considered herein in connection with coffee brewing for convenience.

In general, the invention contemplates a machine which includes: a brewing station into which each compartment in the ribbon is moved; first and second brewing heads in the brewing station adapted to clamp the ribbon therebetween around one of the compartments in the ribbon and respectively provided with first and second water passages therein by means of which hot water may be circulated through the ground coffee in such compartment, the second brewing head being movable axially toward and away from the first brewing head and into clamping engagement with the ribbon around one of the compartments therein; means for flowing hot water through the passages in the brewing heads and through the ribbon compartment therebetween so as to extract a serving of coffee from the ground coffee in such compartment; rotary ribbon advancing means angularly displaceable in a step-by-step manner for advancing successive ones of the ribbon compartments into the brewing station and between the brewing heads; and means for displacing the rotary ribbon advancing means in a step-by-step manner in synchronism with the movement of the second brewing head toward and away from the first.

A primary object of the invention is to reciprocate the second brewing head toward and away from the first, and to synchronously displace the rotary ribbon advancing means, utilizing the pressure of the water delivered to the machine, wherefore no electric motors or other electric actuating devices, or the like, are required for this purpose.

More particularly, an important object of the invention is to provide means for axially moving the second brewing head toward the first, and into clamping engagement with the ribbon around a compartment therein, which includes a cylinder having therein a piston connected to the second brewing head and which includes means for admitting water under pressure into the cylinder on one side of the piston to move the second brewing head axially in one direction, the second brewing head being moved axially in the other direction by a spring.

Another important object of the invention is to provide interengageable cam means respectively connected to the rotary ribbon advancing means and to the aforementioned piston for angularly displacing the ribbon advancing means one step for each reciprocatory movement of the piston, so that the pressure of the water delivered to the machine serves both to displace the second brewing head relative to the first and to operate the ribbon advancing means.

A related object is to provide interengageable cam means interconnecting the ribbon advancing means and the piston which includes a cam connected to the ribbon advancing means and a cam follower mounted on the second brewing head and engaging such cam.

Still another object is to provide a machine which includes a water heating means connected to the passage in the first brewing head and structurally connected to the first brewing head, whereby the first brewing head is maintained at an elevated temperature by conduction of heat thereto from the water heating means to minimize cooling of the hot water as it passes through the first brewing head and into a ribbon compartment disposed between the two brewing heads when the ribbon is clamped therebetween.

Yet another object of the invention is to provide valve means carried by the first brewing head and controlling flow through the first passage and movable to an open position in response to clamping of the ribbon between the first and second brewing heads, for flowing water from the first passage through a ribbon compartment clamped between the brewing heads into the second passage so as to extract coffee from the ground coffee in such compartment. Thus, the valve means mentioned opens automatically upon clamping of the ribbon between the two brewing heads.

A further object of the invention is to provide means for controlling the quantity of hot water used in making each serving of coffee brew.

The foregoing objects, advantages, features and results of the present invention, together with various other objects, advantages, features and results thereof which will be evident to those skilled in the brewing art in the light of this disclosure, may be achieved with the exemplary embodiment of the invention described in detail hereinafter and illustrated in the accompanying drawings, in which:

FIG. 2 is a vertical sectional view taken along the arrowed line 2—2 of FIG. 1;

FIG. 3 is a schematic view of the beverage brewing machine of the invention;

FIG. 4 is a fragmentary sectional view duplicating a portion of FIG. 2, but showing various parts in different operating positions;

FIG. 5 is a perspective view of a fragment of a tap or ribbon comprising longitudinally spaced, water pervious compartments containing a brewable material, such as ground coffee, from which a beverage is to be extracted;

FIG. 6 is a sectional view on an enlarged scale taken along the arrowed line 6—6 of FIG. 5;

FIG. 7 is a view duplicating a portion of FIG. 1, but showing parts in different operating positions; and FIG. 8 is an enlarged, fragmentary sectional view duplicating a portion of FIG. 2, but showing various parts in different operating positions.

Figure 1:
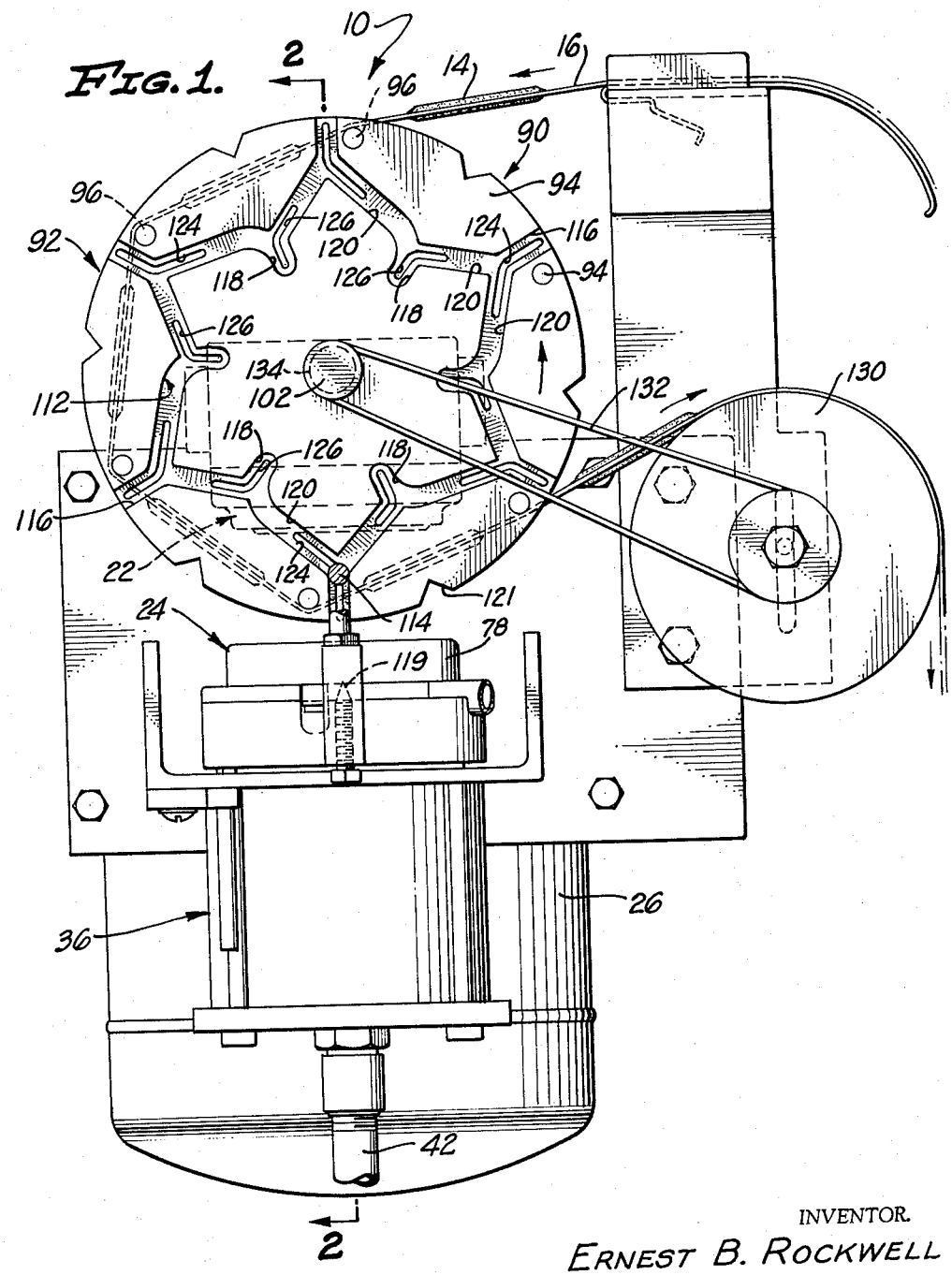
FIG. 1 is an elevational view showing somewhat diagrammatically a beverage brewing machine which embodies the invention.

In the drawings, the beverage brewing machine of the invention, which will be referred to hereinafter as a coffee brewing machine, for convenience, is designated generally by the numeral 10. The machine 10 provides a brewing station 12 in which it brews successive individual servings of coffee from batches of ground coffee contained in successive longitudinally spaced, water pervious compartments 14 formed in a ribbon or tape 16, FIGS. 5 and 6. The ribbon 16 may be formed of two layers 18, FIG. 6, of porous paper adhered together except in the regions occupied by the longitudinally spaced, water pervious compartments 14. The ribbon 16 is provided with two rows of longitudinally spaced perforations 20 the longitudinal spacing of which is the same as the longitudinal spacing of the compartments 14. As will be explained, these perforations are used to properly index the ribbon 16 so as to place successive compartments 14 in the brewing station 12.

Turning now to FIG. 3 of the drawings for a general consideration of the coffee brewing machine 10, it includes first and second brewing heads 22 and 24 located in the brewing station 12 and adapted to clamp the ribbon 16 therebetween around successive ones of the compartments 14 therein. In the particular construction illustrated, the brewing head 22 is relatively stationary and the brewing head 24 is axially movable toward and away from the brewing head 22. The machine 10 includes a source of hot water shown as comprising a storage tank 26 containing an electric heater 28 connected in series with a thermostat 30 which maintains the temperature of the water in the tank 26 substantially constant at the desired level. As will be described hereinafter, when the brewing heads 22 and 24 clamp the ribbon 16 therebetween around one of the compartments 14, hot water from the tank 26 is caused to flow through the ground coffee in such compartment by way of a first passage 32 in the brewing head 22. The coffee brew thus extracted from the ground coffee in the compartment 14 in question is discharged through a second passage 34 in the brewing head 24, such second passage taking any convenient form suitable for discharging the brewed coffee beverage into a cup, or other receptacle.

Continuing to refer particularly to FIG. 3 of the drawings, the brewing head 24 is adapted to be moved toward and away from the stationary brewing head 22 by a reciprocatory fluid motor 36 coaxial with the brewing heads. The fluid motor 36 includes a cylinder 38 coaxial with the brewing heads 22 and 24 and having therein a piston 40 connected to the movable brewing head 24. As will be apparent, when a fluid under pressure is admitted into the cylinder 38 below the piston 40 through a conduit 42, the piston is displaced upwardly to move the brewing head 24 toward the stationary brewing head 22 so as to clamp the ribbon 16 between the two brewing heads around one of the compartments 14 therein. The piston 40 is biased downwardly by a compression spring 44 within the cylinder 38 so that, when the application of fluid pressure to the cylinder below the piston is terminated, the spring displaces the movable brewing head 24 downwardly away from the stationary head 22.

An important feature of the invention is that the fluid motor 36 is water operated, being connected to the same water supply as the water heating means formed by the tank 26 and the heater 28. Thus, the machine 10 is adapted to be connected to a water supply conduit 46 having a branch 48 leading to the hot water tank 26 through a pressure regulating valve 50. Another branch 52 of the supply conduit 46 leads to a control valve 54 which is adapted to place the supply conduit either in communication with the conduit 42 leading to the cylinder 38, or a discharge conduit 56 leading to a suitable drain. The control valve 54 may include any conventional electrically-operated timer means for placing the supply conduit branch 52 in communication with the cylinder 38 for the length of time necessary to extract one beverage serving, preferably individual beverage serving, from the ground coffee and one of the compartments 14. With this construction, clamping of the ribbon 16 between the two brewing heads 22 and 24 around one of the compartments 14 therein preferably automatically initiates the flow of hot water through the compartment by way of the passages 32 and 34, as will be described hereinafter. The electrically-operated timer means for placing the supply conduit branch 52 in communication with the conduit 42 for a fixed interval is controlled by a switch 58, which may be actuated by a coin-operated mechanism, not shown. Except when energized by closure of the switch 58, the control valve 54 connects the cylinder 38 to the discharge conduit 56 to permit the spring 44 to displace the movable brewing head 24 away from the stationary brewing head 22.

It will be understood that instead of operating the control valve 54 with an electrically-actuated time as hereinbefore discussed, the quantity of hot water passed through each compartment 14 may be controlled by a suitable flowmeter. In this instance, when the correct volume of hot water has been passed through one of the compartments 14, the flowmeter may deenergize the electrically-operated control valve 54. Various other arrangements for passing a metered quantity of hot water through each compartment 14 of the ribbon 16 may also be utilized within the scope of the present invention.

As best shown in FIG. 2 of the drawings, the stationary brewing head 22 includes a metal supporting member 60 which is welded directly to the hot water storage tank 26 so that the various parts of the stationary brewing head are heated by conduction from the storage tank. With this construction, an excessive drop in the temperature of the hot water flowing through the stationary brewing head 22 is automatically avoided and in a very simple manner, which is an important feature.

The stationary brewing head 22 includes a tubular head member 62 which is vertically slidable in a bore 64 in the supporting member 60. Downward movement of the head member 62 is limited by three uniformly circumferentially spaced studs 66 extending upwardly from the head member through the supporting member 60. These studs, only one of which is visible in the drawings, are encircled by compression coil springs 68 which bias the head member 62 downwardly relative to the supporting member 60.

The head member 62 is provided adjacent its lower end with a downwardly facing, annular valve seat 70 which is normally urged into sealing engagement with a poppet valve 72 by the springs 68, this poppet valve having a stem 74 secured to the supporting member 60 by a screw 76. The poppet valve 72 and its seat 70 constitute a valve means for controlling flow of hot water from the storage tank 26 through the passage 32 in the stationary brewing head 22.

The axially movable brewing head 24 includes a head member 78 seated in a socket 80 in the brewing head 24 and held therein by a set screw 82, FIG. 2. The aforementioned passage 34, through which brewed coffee is discharged, is formed in the brewing head 24 and its head member 78.

The head member 78 is provided with a central, upwardly facing recess 84 which is adapted to receive one of the ribbon compartments 14 therein, as shown in FIGS. 4 and 8 of the drawings. The head member 62 on the stationary brewing head 22 is provided with a complementary central recess 86 formed by an elastomeric annular sealing element 88 carried by the head member 62 and engageable in fluid tight relation with the upper surface of the head member 78 around the central recess 84 therein. With this construction, when the movable brewing head 24 is displaced upwardly into engagement with the stationary brewing head 22, the ribbon 16 is clamped between the two head members 62 and 78 with one of the compartments 14 disposed in the central recesses 84 and 86, the annular sealing element 88 providing a fluid tight seal preventing leakage when hot water is passed through the ground coffee in such compartment.

As shown in FIGS. 4 and 8 of the drawings, when the movable brewing head 24 is displaced upwardly to the upper end of its stroke by the piston 40 in the manner hereinbefore described, the head member 62 on the stationary brewing head 22 is displaced upwardly slightly to move the valve seat 70 thereon upwardly out of engagement with the head of the poppet valve 72. Thus, this has the effect of opening the valve means controlling flow through the passage 32 in the stationary brewing head 22, whereby to permit hot water from the storage tank 26 to flow through the ground coffee in a compartment 14 clamped between the brewing heads 22 and 24. The resulting coffee beverage flows through the passage 34 into any suitable receptacle, such as an individual serving cup, not shown.

Thus, the present invention provides a valve means, constituted by the valve seat 70 and the poppet valve 72, which controls flow through the passage 32 and which is movable to its open position in response to clamping of the ribbon 16 between the brewing heads 22 and 24 upon upward movement of the brewing head 24 into engagement with the brewing head 22.

The coffee brewing machine 10 includes a rotary ribbon advancing means 90, angularly displaceable in a step-by-step manner, for advancing successive ones of the ribbon compartments 14 into the brewing station 12, i.e., into position between the brewing heads 22 and 24. More particularly, the machine 10 includes interengageable cam means 92 respectively connected to the ribbon advancing means 90 and the fluid motor 36 for angularly displacing the ribbon advancing means one step for each complete stroke of the fluid motor.

The ribbon advancing means 90 includes a rotor, preferably a disc 94, provided adjacent its periphery with circumferentially spaced, longitudinally extending fingers 96, the distance between adjacent fingers 96 being equal to the longitudinal spacing of the perforations 20 in the ribbon 16. Each finger 96 is provided with two pins 98 respectively insertable into laterally-opposite perforations 20. Thus, the disc 94, the longitudinal fingers 96 thereon, and the pins 98 on the fingers, provide a reel 100 which positively controls the advancement of the ribbon 16 through the brewing station 12 when the reel is angularly displaced in a step-by-step manner by the cam means 92, as will be described.

The reel 100 includes a hub 102 rotatably mounted on a support 104 which is carried by and movable vertically relative to the supporting member 60 of the stationary brewing head 22. The support 104 is guided for its vertical movement relative to the supporting member 60 by a guide pin 106 which extends through the supporting member 60 and which is encircled by a compression coil spring 108 for biasing the support 104 downwardly into a retracted position determined by an adjusting screw 110. As best shown in FIG. 7 of the drawings, the cam means 92, which will be described hereinafter, functions to orient each section of the ribbon 16 which carries one of the compartments 14, perpendicularly of the axis of the brewing heads 22 and 24 when the compartment 14 carried by such ribbon section is in the brewing station 12 between the brewing heads. When the movable brewing head 24 is displaced axially toward the stationary brewing head 22 by the fluid motor 36, the movable brewing head engages the ribbon section in the brewing station 12 and simultaneously engages the two fingers 96 which support such ribbon section, whereby the ribbon section in the brewing station lies flat across the top of the movable brewing head, as shown in FIG. 7 of the drawings. Upon further displacement of the movable brewing head 24 toward the stationary brewing head 22, the reel 100 is displaced upwardly, along with the movable brewing head, under the guidance of the guide pin 106, to bring the ribbon section in question flat against the annular sealing element 88 on the head member 62 of the stationary brewing head 22. Thus, when the ribbon section containing the particular compartment 14 through which hot water is to be passed is clamped between the two brewing heads 22 and 24, it remains stretched in a flat condition across the corresponding two fingers 96 so as to avoid any distortion of the ribbon 16 tending to tear it around the corresponding perforations 20 therein. Thus, the fact that the reel 100 follows the movable brewing head 24 as each ribbon section is clamped between the two brewing heads 22 and 24 insures that the ribbon section in question will be clamped between the two brewing heads in a flat condition to eliminate any possibility of damage to the ribbon, which is an important feature. Of course, as the movable brewing head 24 is subsequently returned to its retracted position by the spring 44, the reel 100 follows the movable brewing head only to the extent permitted by the adjustable stop screw 110.

Considering the cam means 92, it consists of a cam groove 112 in an end face of the disc 94 and receiving therein a cam follower 114 connected to the movable brewing head 24. The cam groove 112 includes circumferentially spaced, radially oriented outer sections 116 each adapted to receive the cam follower 114, which is simply a longitudinally extending pin, when the piston 40 has been moved to the end of its travel corresponding to the position of the brewing head 24 which is farthest from the brewing head 22. Intermediate the outer radial sections 116 are circumferentially spaced, radially oriented inner groove sections 118 each adapted to receive the cam follower 114 when the movable brewing head 24 clamps a section of the ribbon 16 against the stationary brewing head 22. The inner ends of the outer radial sections 116 of the cam groove 112 are connected to the outer ends of adjacent inner radial sections 118 thereof by groove sections 120.

Considering the operation of the cam means 92, when the piston 40 is at the bottom of its stroke as viewed in the drawings, the cam follower 114 is disposed in one of the outer radial groove sections 116. As the piston moves upwardly, the cam follower 114 enters the left hand connecting groove section 120 and, ultimately, the inner radial section 118 at the end of such connecting section. As the cam follower 114 reaches the inner end of such inner radial section 118, a tapered pin 119 on the brewing head 24 enters a notch 121 in the cam disc 94 to insure accurate indexing of the reel 100. At this point, one section of the ribbon 16 is properly positioned relative to and is clamped between the two brewing heads 22 and 24. At the same time, of course, the valve means in the stationary brewing head 22 is opened automatically to flow hot water through the corresponding compartment 14 to brew coffee from the ground coffee therein. At the end of the brewing operation, the control valve 54 interrupts the application of water pressure to the lower end of the piston 40 to permit the spring 44 to return the piston to its lowermost position. As this occurs, the cam follower 114 leaves the inner radial groove section 118 in which it is disposed and enters the left hand connecting groove section 120 in communication therewith until it ultimately reaches the next outer radial groove section 116. At this point, the machine 10 is ready for another cycle.

To switch the cam follower 114 from each radial section 116 and 118 into the proper connecting section 120, the follower 114 is provided with an auxiliary follower 122, in the form of a spring-pressed ball detent, which is adapted to run in auxiliary, switching groove sections 124 and 126 in the inner wall of the main cam groove 112. More particularly, considering the various parts in the relative positions of FIG. 1, as the cam follower 114 moves upwardly, the auxiliary follower 122, running in the corresponding switching groove section 124, causes the cam follower 114 to enter the left hand one of the adjacent connecting groove sections 120, as previously mentioned. Similarly, as the cam follower 114 moves downwardly in leaving each of the inner radial groove sections 118, the auxiliary follower 122, running in the corresponding switching groove section 126, causes the cam follower 114 to enter the left hand one of the adjacent connecting groove sections 120. When the auxiliary follower 122 is not running in one of the auxiliary, switching groove sections 124 and 126, it is depressed into the main cam follower 114.

The expended portion of the ribbon 16 is trained around a roller 130 which is driven by a belt 132 running in a pulley groove 134 in the hub 102 of the reel 100. Thus, not only does the fluid motor 336 operate the movable brewing head 24 and the rotary ribbon advancing means 90, but it also operates the guide roller 130 for the expended portion of the ribbon 16. As hereinbefore explained, the pressure of the water supplied to the coffee brewing machine 10 is preferably utilized to operate the fluid motor 36 so that all of the major moving parts of the machine are operated simply by water pressure, requiring no electric motors, or other electric actuating devices, which is an important feature.

It will be understood that the machine 10 may be supplied with a suitable magazine, not shown, containing an appropriate length of the ribbon 16, and that the expended portion of the ribbon may, after passing over the guide roller 130, be discharged into a suitable disposal container, not shown.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:

1. In a machine for brewing successive portions of a beverage from a ribbon having longitudinally spaced, water pervious compartments containing the material from which the beverage is to be extracted, by flowing water through successive ones of said compartments at a brewing station, the combination of:
   (a) a first head in said brewing station and engageable with one side of said ribbon around a said compartment in said brewing station, said first head being provided with a first water passage adapted to communicate with a said compartment in said brewing station;
   (b) a second head in said brewing station and engageable with the other side of said ribbon around a said compartment in said brewing station, said second head being axially movable toward said first head to clamp said ribbon between said heads around a said compartment in said brewing station, said second head being provided with a second water passage therethrough adapted to communicate with a said compartment in said brewing station;
   (c) means for axially moving said second head toward and away from said first head and into clamping engagement with said ribbon around a said compartment therebetween, comprising a cylinder having therein a piston connected to said second head and means for admitting fluid under pressure into said cylinder on one side of said piston to move said second head axially toward said first head;
   (d) rotary ribbon advancing means angularly displaceable in a step-by-step manner for advancing successive ones of said compartments into said brewing station and between said heads;
   (e) interengageable cam means respectively connected to said rotary ribbon advancing means and to said piston for rotating said advancing means one step for each reciprocatory movement of said piston; and
   (f) means for flowing water from one of said passages through a said compartment clamped between said heads into the other of said passages to extract the beverage from the material in such compartment.

2. In a machine for brewing successive portions of a beverage from a ribbon having longitudinally spaced, water pervious compartments containing the material from which the beverage is to be extracted, by flowing hot water through successive ones of said compartments at a brewing station, the combination of:
   (a) a first head in said brewing station and engageable with one side of said ribbon around a said compartment in said brewing station, said first head being provided with a first water passage adapted to communicate with a said compartment in said brewing station;
   (b) a second head in said brewing station and engageable with the other side of said ribbon around a said compartment in said brewing station, said second head being axially movable toward said first head to clamp said ribbon between said heads around a said compartment in said brewing station, said second head being provided with a second water passage therethrough adapted to communicate with a said compartment in said brewing station;
   (c) means for axially moving said second head toward and away from said first head and into clamping engagement with said ribbon around a said compartment therebetween, comprising a cylinder having therein a piston connected to said second head and means for admitting water under pressure into said cylinder on one side of said piston to move said second head axially toward said first head;
   (d) rotary ribbon advancing means angularly displaceable in a step-by-step manner for advancing successive ones of said compartments into said brewing station and between said heads;
   (e) interengageable cam means respectively connected to said rotary ribbon advancing means and to said piston for rotating said advancing means one step for each reciprocatory movement of said piston;
   (f) water heating means connected to one of said passages; and
   (g) valve means for controlling flow through said one passage for flowing hot water from said one passage through a said compartment clamped between said heads into the other of said passages to extract the beverage from the material in such compartment.

3. In a machine for brewing successive portions of a beverage from a ribbon having longitudinally spaced, water pervious compartments containing the material from which the beverage is to be extracted, by flowing hot water through successive ones of said compartments at a brewing station, the combination of:
   (a) a first head in said brewing station and engageable with one side of said ribbon around a said compartment in said brewing station, said first head being provided with a first water passage adapted to communicate with a said compartment in said brewing station;
   (b) a second head in said brewing station and engageable with the other side of said ribbon around a said compartment in said brewing station, said second head being axially movable toward said first head to clamp said ribbon between said heads around a said compartment in said brewing station, said second head being provided with a second water passage therethrough adapted to communicate with a said compartment in said brewing station;
   (c) means for axially moving said second head toward and away from said first head and into clamping engagement with said ribbon around a said compartment therebetween, comprising a cylinder having therein a piston connected to said second head and means for admitting water under pressure into said cylinder on one side of said piston to move said second head axially toward said first head;
   (d) rotary ribbon advancing means angularly displaceable in a step-by-step manner for advancing successive ones of said compartments into said brewing station and between said heads;
   (e) interengageable cam means respectively connected to said rotary ribbon advancing means and to said piston for rotating said advancing means one step for each reciprocatory movement of said piston;
   (f) water heating means connected to one of said passages; and
   (g) valve means for controlling flow through said one passage and movable to an open position in response to clamping of said ribbon between said first and second heads for flowing hot water from said one passage through a said compartment clamped between said heads into the other of said passages to extract the beverage from the material in such compartment.

4. In a machine for brewing successive portions of a beverage from a ribbon having longitudinally spaced, water pervious compartments containing the material from which the beverage is to be extracted, by flowing hot water through successive ones of said compartments at a brewing station, the combination of:

(a) a first head in said brewing station and engageable with one side of said ribbon around a said compartment in said brewing station, said first head being provided with a first water passage adapted to communicate with a said compartment in said brewing station;

(b) a second head in said brewing station and engageable with the other side of said ribbon around a said compartment in said brewing station, said second head being axially movable toward said first head to clamp said ribbon between said heads around a said compartment in said brewing station, said second head being provided with a second water passage therethrough adapted to communicate with a said compartment in said brewing station;

(c) means for axially moving said second head toward and away from said first head and into clamping engagement with said ribbon around a said compartment therebetween, comprising a cylinder having therein a piston connected to said second head and means for admitting water under pressure into said cylinder on one side of said piston to move said second head axially toward said first head;

(d) rotary ribbon advancing means angularly displaceable in a step-by-step manner for advancing successive ones of said compartments into said brewing station and between said heads;

(e) interengageable cam means respectively connected to said rotary ribbon advancing means and to said piston for rotating said advancing means one step for each reciprocatory movement of said piston;

(f) water heating means connected to said first passage;

(g) valve means carried by said first head for controlling flow through said first passage and movable to an open position in response to clamping of said ribbon between said first and second heads for flowing water from said first passage through a said compartment clamped between said heads into said second passage to extract the beverage from the material in such compartment; and (h) said first head being mounted on said water heating means so that said first head is maintained at an elevated temperature by conduction of heat from said water heating means.

5. In a machine for brewing successive portions of a beverage from a ribbon having longitudinally spaced, water pervious compartments containing the material from which the beverage is to be extracted, by flowing hot water through successive ones of said compartment at a brewing station, the combination of:

(a) a first head in said brewing station and engageable with one side of said ribbon around a said compartment in said brewing station, said first head being provided with a first water passage adapted to communicate with a said compartment in said brewing station;

(b) a second head in said brewing station and engageable with the other side of said ribbon around a said compartment in said brewing station, said second head being axially movable toward said first head to clamp said ribbon between said heads around a said compartment in said brewing station, said second head being provided with a second water passage therethrough adapted to communicate with a said compartment in said brewing station;

(c) means for axially moving said second head toward and away from said first head and into clamping engagement with said ribbon around a said compartment therebetween, comprising a cylinder having therein a piston connected to said second head and means for admitting water under pressure into said cylinder on one side of said piston to move said second head axially toward said first head;

(d) rotary ribbon advancing means angularly displaceable in a step-by-step manner for advancing successive one of said compartments into said brewing station and between said heads;

(e) interengageable cam means respectively connected to said rotary ribbon advancing means and to said piston for rotating said advancing means one step for each reciprocating movement of said piston, said cam means including a cam connected to said rotary ribbon advancing means and a cam follower mounted on said second head;

(f) water heating means connected to said first passage;

(g) valve means carried by said first head for controlling flow through said first passage and movable to an open position in response to clamping of said ribbon between said first and second heads for flowing water from said first passage through a said compartment clamped between said heads into said second passage to extract the beverage from the material in such compartment; and (h) said first head being mounted on said water heating means so that said first head is maintained at an elevated temperature by conduction of heat from said water heating means.

6. In a machine for brewing successive portions of a beverage from a ribbon having longitudinally spaced, water pervious compartments containing the material from which the beverage is to be extracted, by flowing water through successive ones of said compartments at a brewing station, the combination of:

(a) a first head in said brewing station and engageable with one side of said ribbon around a said compartment in said brewing station, said first head being provided with a first water passage adapted to communicate with a said compartment in said brewing station;

(b) a second head in said brewing station and engageable with the other side of said ribbon around a said compartment in said brewing station, said second head being axially movable toward said first head to clamp said ribbon between said heads around a said compartment in said brewing station, said second head being provided with a second water passage therethrough adapted to communicate with a said compartment in said brewing station;

(c) means for axially moving said second head toward and away from said first head and into clamping engagement with said ribbon around a said compartment therebetween, comprising a cylinder having therein a piston connected to said second head and means for admitting fluid under pressure into said cylinder on one side of said piston to move said second head axially towards said first head;

(d) rotary ribbon advancing means angularly displaceable in a step-by-step manner for advancing successive ones of said compartments into said brewing station and between said heads;

(e) interengageable cam means respectively connected to said rotary ribbon advancing means and to said piston for rotating said advancing means one step for each reciprocatory movement of said piston, said cam means including a cam connected to said rotary ribbon advancing means and a cam follower mounted on said second head; and (f) means for flowing water from one of said passages through a said compartment clamped between said heads into the other of said passages to extract the beverage from the material in such compartment.

7. In a machine for brewing successive portions of a beverage from a ribbon having longitudinally spaced, water pervious compartments containing the material from which the beverage is to be extracted, by flowing hot water through successive ones of said compartments at a brewing station, the combination of:
 (a) a first head in said brewing station and engageable with one side of said ribbon around a said compartment in said brewing station, said first head being provided with a first water passage adapted to communicate with a said compartment in said brewing station;
 (b) a second head in said brewing station and engageable with the other side of said ribbon around a said compartment in said brewing station, said second head being axially movable toward said first head to clamp said ribbon between said heads around a said compartment in said brewing station, said second head being provided with a second water passage therethrough adapted to communicate with a said compartment in said brewing station;
 (c) means for axially moving said second head toward and away from said first head and into clamping engagement with said ribbon around a said compartment therebetween, comprising a cylinder having therein a piston connected to said second head and means for admitting fluid under pressure into said cylinder on one side of said piston to move said second head axially toward said first head;
 (d) rotary ribbon advancing means angularly displaceable in a step-by-step manner for advancing successive ones of said compartments into said brewing station and between said heads;
 (e) interengageable cam means respectively connected to said rotary ribbon advancing means and to said piston for rotating said advancing means one step for each reciprocatory movement of said piston;
 (f) means for flowing water from one of said passages through a said compartment clamped between said heads into the other of said passages to extract the beverage from the material in such compartment; and
 (g) said rotary ribbon advancing means being engageable by and movable with said second head as said second head is displaced axially into clamping engagement with said ribbon around a said compartment therein.

8. In a machine for brewing successive portions of a beverage from a ribbon having longitudinally spaced, water pervious compartments containing the material from which the beverage is to be extracted, by flowing water through successive ones of said compartments at a brewing station, the combination of:
 (a) a first head in said brewing station and engageable with one side of said ribbon around a said compartment in said brewing station, said first head being provided with a first water passage adapted to communicate with a said compartment in said brewing station;
 (b) a second head in said brewing station and engageable with the other side of said ribbon around a said compartment in said brewing station, said second head being axially movable toward said first head to clamp said ribbon between said heads around a said compartment in said brewing station, said second head being provided with a second water passage therethrough adapted to communicate with a said compartment in said brewing station;
 (c) means for axially moving said second head toward and away from said first head and into clamping engagement with said ribbon around a said compartment therebetween;
 (d) rotary ribbon advancing means angularly displaceable in a step-by-step manner for advancing successive ones of said compartments into said brewing station and between said heads;
 (e) means for rotating said advancing means one step for each reciprocatory movement of said second head;
 (f) water heating means connected to said first passage;
 (g) valve means carried by said first head for controlling flow through said first passage and movable to an open position in response to clamping of said ribbon between said first and second heads for flowing water from said first passage through a said compartment clamped between said heads into said second passage to extract the beverage from the material in such compartment; and
 (h) said first head being mounted on said water heating means so that said first head is maintained at an elevated temperature by conduction of heat from said water heating means.

References Cited in the file of this patent
UNITED STATES PATENTS
2,939,380 Parraga _____ June 7, 1960
3,046,869 Reynolds _____ July 31, 1962
FOREIGN PATENTS
258,139 Italy _____ Apr. 6, 1928
871,324 Great Britain _____ June 28, 1961
1,238,694 France _____ July 4, 1960